Oct. 5, 1965
H. R. COPSY
3,210,726
MULTIPLE VEHICLE BRAKE ACTUATED AUTOMATIC
STOP LIGHT WARNING SYSTEM
Filed April 1, 1963
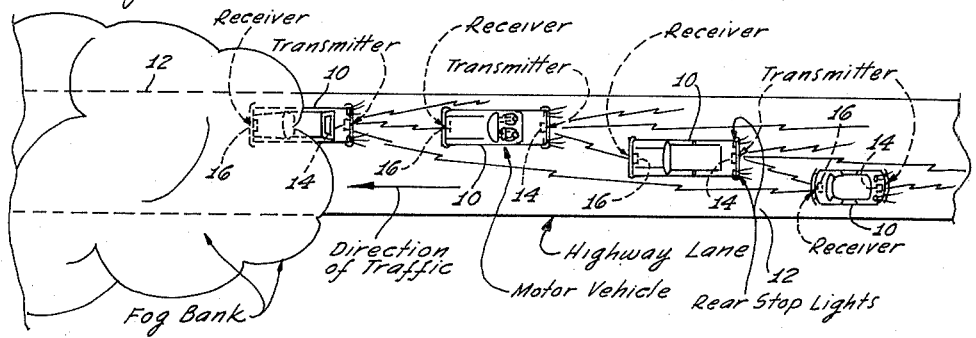
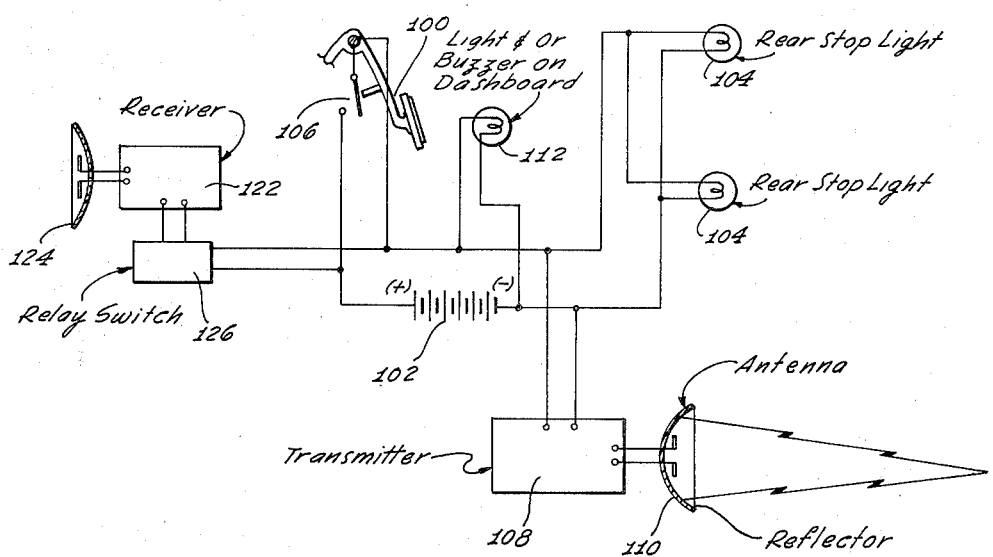
INVENTOR:
Harry R. Copsy
Attorney

United States Patent Office 3,210,726
Patented Oct. 5, 1965

3,210,726
MULTIPLE VEHICLE BRAKE ACTUATED AUTOMATIC STOP LIGHT WARNING SYSTEM
Harry R. Copsy, 14662 Bledsoe St., Sylmar, Calif.
Filed Apr. 1, 1963, Ser. No. 269,511
3 Claims. (Cl. 340—33)

The present invention relates generally to vehicular warning systems; and it relates more particularly to an improved vehicular warning system which is adapted to guard against collisions in fog, or in other circumstances of limited visibility, and which serves to insure maximum safety in the operation of motor vehicles, and the like, under all conditions.

Multiple chain-reaction type traffic accidents have become more and more prevalent in recent years. These accidents are often extremely serious due to the high speed of present-day traffic on highways, turnpikes, freeways, and the like.

Fog, when it occurs in banks or patches, is often the underlying cause of the chain-reaction type of traffic accident. Under such fog conditions, it often happens that a person driving in bright sunlight at a normally high rate of speed suddenly finds himself in dense fog.

It then often happens that before the driver can react to the changed conditions he crashes into a car in front of him, which has decreased its speed. The resulting collision and accident then creates obstacles on the highway in the fog bank.

The situation then arises that before the drivers of the other vehicles can stop their cars, they too enter into the fog bank and crash into the other vehicles. These latter collisions, in turn, create further hazards, so that the action is cumulative and often results in a large number of cars being wrecked, and a large number of persons being killed and injured.

An important object of the present invention is to provide an improved vehicular warning system which is capable of eliminating the compound damage due to the above-mentioned chain reaction of colliding vehicles on the highways.

It will be appreciated that a subsequent car entering the fog bank after previous cars have collided with one another has no way of knowing that anything is amiss until he enters the fog bank and suddenly sees, with restricted visibility, the illuminated stop lights of the car immediately in front of him, as the driver of that car applies his brakes. However, the normal human reaction time is such, that it is usually too late at that point to avoid an accident.

In accordance with the concepts of the present invention, automatic means is provided, so that when the driver of any car in a succession of cars applies his foot brake to stop his vehicle and thereby turn on his rear stop lights, the following cars are automatically controlled in a combined simultaneous and sequential manner so that the stop lights of all the following cars are also illuminated.

In the practice of the invention, therefore, should a motor vehicle entering a fog bank, for example, encounter some hazard, the driver of the vehicle with normal reaction immediately applies his brake. This action, when the cars are equipped with the apparatus of the present invention, not only causes the rear stop lights of one particular car to be illuminated, but also causes the stop lights of all the following cars down the line, likewise, to be energized.

Therefore, instead of a fog-obliterated single pair of rear stop lights being illuminated when an emergency situation arises, as is presently the case; a chain of stop lights is activated by the system of the invention extending back down the line of traffic. This means that everyone in the line of traffic is put on guard, even before the fog bank is encountered, that a hazard exists somewhere ahead.

Under conditions when all vehicles are equipped with the system and apparatus of the invention, the above-described action of automatically controlled, illuminated stop lights of vehicles down the line of traffic is sequential. That is, each vehicle causes the stop light of the following vehicle to be automatically energized by the actuation by the driver of the foot brake.

When the driver of each following vehicle sees the energized stop lights of the vehicle in front of him, he also applies his foot to the foot brake, so that his lights become illuminated. This action, in turn, causes the lights of the following vehicle to be automatically energized, and so on. However, the system of the invention is preferably constructed to have sufficient strength so that, in the event intermediate vehicles in the succession of vehicles are not equipped with the apparatus, a succeeding properly equipped vehicle down the line will be activated.

Briefly described, the system of the invention includes the provision of a suitable signal generator which is capable of generating an appropriate radiation signal. This signal, for example, may be light, radio, infrared, ultrasonic, and so on. The signal generator, for example, is coupled to a transmitting antenna mounted on the rear of the vehicle.

When the above-mentioned transmitter is activated, the antenna radiates the resulting signal in a beam. This beam is directed at the following vehicles, so that their control systems may be activated. The beam is made sufficiently sharp so that oncoming vehicles in adjacent lanes are not affected. Moreover, the signals are sufficiently intense, as mentioned above, so that following vehicles, which are behind other vehicles not equipped with the apparatus of the invention, may be controlled by the beam so as to maintain the chain.

Further in accordance with the invention, a receiver for receiving the aforementioned signal is mounted in each vehicle, and the receiver is coupled to an appropriate antenna mounted at the front of the vehicle. As mentioned above, the signal radiated between each pair of vehicles is beamed so that only cars immediately following the transmitting car can sense and respond to the signal.

The signal generator, or transmitter, is activated upon the actuation of the brake pedal in the motor vehicle. This actuation of the brake pedal, therefore, not only serves to stop the vehicle and to illuminate its rear stop lights, but it also serves to transmit a warning signal in the form of a beam and directed at the vehicles following the transmitting vehicle.

When a following vehicle receives the beamed signal from the car ahead, signifying that the brakes of the car ahead have been applied, the following car's stop lights are illuminated and its signal generator, or transmitter, is turned on. This enables the following car, in turn, to indicate to the cars following it that the driver of some vehicle ahead has applied his brakes.

It is also preferred that a suitable indicator, such as a warning electric light, be placed in the interior of the vehicle in the vicinity, for example, of the dashboard. This warning light serves to apprise the driver of the vehicle that his stop lights have been activated by a car ahead and that he should be on guard for a hazardous condition.

It is, accordingly, an object of the present invention to provide an improved vehicular warning system for particular use on highways, and the like, where due to the usual high speed of travel, there is insufficient time for normal driver reaction to sudden emergencies and hazards.

Another object is to provide such an improved warning system which is particularly useful for preventing the chain-reaction type of accident due to fog banks and the like.

A still further object of the invention is to provide such an improved warning system which operates to control the rear stop light of the vehicle, so that the drivers are informed of hazardous conditions through normal means to which they have long become accustomed, and will respond with normal reactions to avert the condition.

Yet another object of the invention is to provide such an improved system which is automatic in its operation and which does not require any extraneous operations on the part of the driver of the vehicle to operate the system.

A further object of the invention is to provide such an improved system which is relatively simple in its concept and relatively inexpensive to construct.

A further object of the invention is to provide such an improved system which can be installed in existing motor vehicles easily and at a minimum of cost.

Other objects, features and advantages of the system of the invention will become apparent from a consideration of the following detailed description, when the description is taken in conjunction with the accompanying drawing, in which:

FIGURE 1 is a schematic plan view of a succession of motor vehicles travelling on a highway in a particular direction; and FIGURE 2 is a circuit diagram of one particular embodiment of the system of the invention.

The schematic representation of FIGURE 1 shows a series of motor vehicles 10 travelling along a highway, designated 12, in a direction from the right to the left. Each of the motor vehicles 10, in accordance with the concepts of the present invention is equipped with a transmitter 14 which, for example, is mounted on the rear of the vehicle. In addition, each of the motor vehicles 10 has a receiver 16 mounted, for example, on the front of the vehicle.

As described briefly above, the system of the invention operates in a manner such that when the driver of any one of the motor vehicles applies his foot brakes, so as to stop his vehicle, his rear stop lights immediately become illuminated. This, of course, is to serve as a warning to the driver of the following vehicle. In the system of the present invention, when the driver of the forward vehicle applies his brakes, not only do his stop lights become illuminated, but his transmitter 14 is also activated. This causes the transmitter to radiate a signal in the form of a beam along the highway to the rear of the transmitting vehicle.

The signal transmitted by the transmitter 14 of a particular vehicle is received by the receiver 16 of a following vehicle. The receiver 16, upon the receipt of the signal, close appropriate contacts, so that the rear stop lights of the following vehicles are illuminated. In addition, the transmitter 14 of the following vehicle is activated.

It will be appreciated, therefore, that whenever the driver of a vehicle 10 applies his brakes, not only are his own stop lights illuminated, but also those of the following vehicle. Then, the resulting signal from the following vehicle reacts in exactly the same way with the next following vehicle, and so on down the line.

Also, should the forward vehicle enter a fog bank and encounter a hazard, the resulting application of his foot brakes carries a clear signal down through the line of cars, so that everyone is put on guard.

The circuit diagram of FIGURE 2 illustrates the usual brake foot pedal 100 of the usual motor vehicle. The circuit also includes a battery 102 which may be the usual car battery. Also, included in the system are a pair of stop lights 104 which, in accordance with usual and known practice, are mounted on the rear of the vehicle.

As illustrated in FIGURE 2, whenever the foot pedal 100 is actuated, it closes a switch 106. The closure of the switch 106 causes the stop lights 104 to be illuminated, as is desired.

In the practice of the present invention, a transmitter 108 is connected across the leads extending to the stop lights 104. The connection of the transmitter 108 is such that the transmitter becomes activated whenever the rear stop lights are illuminated.

The transmitter 108 may, as mentioned above, be a radio transmitter, or it may transmit any other type of radiation signal. An appropriate antenna 110 is coupled to the transmitter, and this antenna is positioned on the rear of the vehicle. The antenna 110 transmits a signal beam whenever the transmitter 108 is activated. This signal beam may, for example, be a radio signal, an infrared signal, or any other appropriate signal, as mentioned above.

A warning light 112 is mounted in the interior of the vehicle, preferably adjacent the dashboard. The warning light 112 is illuminated, whenever the stop lights 104 are illuminated, either by the actuation of the foot pedal 100, or by remote control means.

The remote control means referred to immediately above may be effectuated by a receiver 122. The receiver 122 is coupled to an antenna 124 which is mounted on the front of the vehicle. Both the antennas 110 and 124 are equipped with appropriate reflectors, so that a beam-type of communication may be realized.

In response to a signal intercepted by the antenna 124, the receiver 122 causes a relay switch 126, which is coupled to it, to close its contacts. The relay switch 126 is connected across the contacts 106, and it accomplishes, in response to the signal from the remote source, the same control events as the locally actuated foot pedal 100.

It is evident that the apparatus of FIGURE 2 is relatively inexpensive, and is composed of relatively few elements. Moreover, the system may be constructed to occupy a minimum of space. The system is such, and as explained above, that whenever the brakes are applied to a motor vehicle, it radiates a signal in beam form to the following vehicle, and the following vehicle responds to that signal to activate its stop lights, and serve as a warning to the next following vehicle.

While a particular embodiment of the invention has been shown and described, modifications may be made. For example, the transmitter 108 and receiver 122 may be signal generators capable of producing any other type of signal which may be radiated.

It is intended in the following claims to cover all modifications which fall within the range of equivalents of the invention.

What is claimed is:

1. In a motor vehicle which includes manually operated brake actuating means, electrically energized rear stop lights, and electrical means including a switch mechanically coupled to said brake actuating means to cause said stop lights to be energized when said brake actuating means is operated, the combination of: transmitting means coupled to said electrical means to be activated when said brake actuating means is operated; means mounted on the rear of the vehicle and coupled to said transmitting means for projecting signals in a beam rearwardly of said vehicle when said transmitting means is activated; receiving means for receiving such a projected signal from another vehicle; means mounted on the front of the vehicle for intercepting such a signal from another vehicle and coupled to said receiving means for introducing the intercepted signal thereto; and relay switching means coupled to said receiving means for completing a circuit across the first mentioned switch in response to the signal introduced by said intercepting means to said receiving means.

2. In a motor vehicle which includes manually operated brake actuating means, electrically energized rear stop lights, and electrical means including a switch mechanically coupled to said brake actuating means to cause said stop lights to be energized when said brake actuating means is operated, the combination of: a radio transmitter coupled to said electrical means to be activated when said brake actuating means is operated; transmitter antenna means mounted on the rear of the vehicle and coupled to said radio transmittter for projecting a radio signal in a beam rearwardly of said vehicle when said transmitter is activated; a radio receiver for receiving such a projected radio signal from another vehicle; receiver antenna means mounted on the front of the vehicle for intercepting such a signal and coupled to said receiver for introducing the intercepted signal thereto; and relay switching means coupled to said receiver for completing a circuit across said first-mentioned switch in response to the signal introduced to said receiver.

3. The combination defined in claim 1 and which includes an electric warning lamp positioned in the interior of the vehicle and connected in circuit with said rear stop light.

References Cited by the Examiner

UNITED STATES PATENTS

| 2,188,293 | 1/40 | Williams | 343—225 |
| 2,961,640 | 11/60 | Von Behren | 340—48 |
| 3,011,580 | 12/61 | Reid | 340—34 |

FOREIGN PATENTS

| 1,000,910 | 10/51 | France. |
| 1,124,641 | 7/56 | France. |

NEIL C. READ, *Primary Examiner.*